United States Patent [19]

Gassner

[11] Patent Number: 5,332,000
[45] Date of Patent: Jul. 26, 1994

[54] LOW PRESSURE SENSITIVE VALVE

[75] Inventor: Paul B. Gassner, Portland, Oreg.

[73] Assignee: Gassner, Inc., Portland, Oreg.

[21] Appl. No.: 669

[22] Filed: Jan. 5, 1993

[51] Int. Cl.$^5$ .............................................. F16K 15/06
[52] U.S. Cl. ................................. 137/543.23; 251/333
[58] Field of Search ............. 137/543.23, 533.29, 137/540, 541; 251/333

[56] References Cited

U.S. PATENT DOCUMENTS

| | | | |
|---|---|---|---|
| 1,733,180 | 10/1929 | Biedermann | 251/333 X |
| 2,447,729 | 8/1948 | Bertea | 137/543.23 |
| 2,745,432 | 5/1956 | Williams | 137/540 |
| 3,027,134 | 3/1962 | Nichols | 251/333 X |
| 3,782,412 | 1/1974 | Darash | 137/540 X |
| 3,835,884 | 9/1974 | Ishikawa | 137/543.23 X |
| 4,805,664 | 2/1989 | Mattei | 137/543.23 |

OTHER PUBLICATIONS

"Relief Valves 500 Series, Popoff, inline 0.5–150 PSi" brochure, Circle Seal Controls, Inc., (undated), pp. 1–6.
"Relief Valves 500 Series, Popoff, inline 0.5–150 PSI" brochure, Circle Seal Controls, Inc., (undated) pp. 1–8.
"200 Series Relief Valve" brochure, Acra Seal, 1 page, (undated).
"VRVI—Series VRVI Relief Valve—Inline ½ to 250 Psi" brochure, Generant Company, Inc. 2 pages, (undated).
"The Quad ® Ring Seal—Reference data on applications, installation, materials and sizes" brochure, Minnesota Rubber and Gasket Company, pp. 1–12 (undated).

Primary Examiner—Robert G. Nilson
Attorney, Agent, or Firm—Klarquist Sparkman Campbell Leigh & Whinston

[57] ABSTRACT

A close tolerance fluid pressure relief or check valve includes a one-piece silicone poppet within a valve body. The poppet makes line contact with a concave seat surface at the inlet end of the body when the poppet is closed. A stem of the poppet extends into an inlet passage of the body to guide poppet movement centrally between open and closed positions. The poppet is biased to its closed position by a spring within the body, the pressure setting of which is controlled by a threaded nut or fitting defining an outlet passage and closing the outlet end of the body.

25 Claims, 2 Drawing Sheets

FIG. 1
Prior Art
FIG. 2
Prior Art
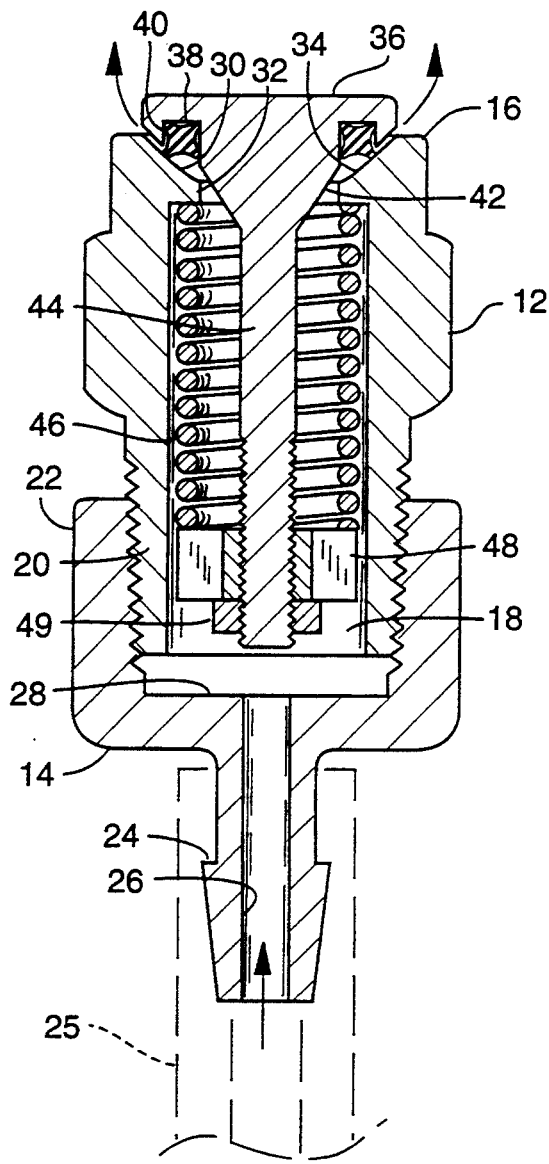
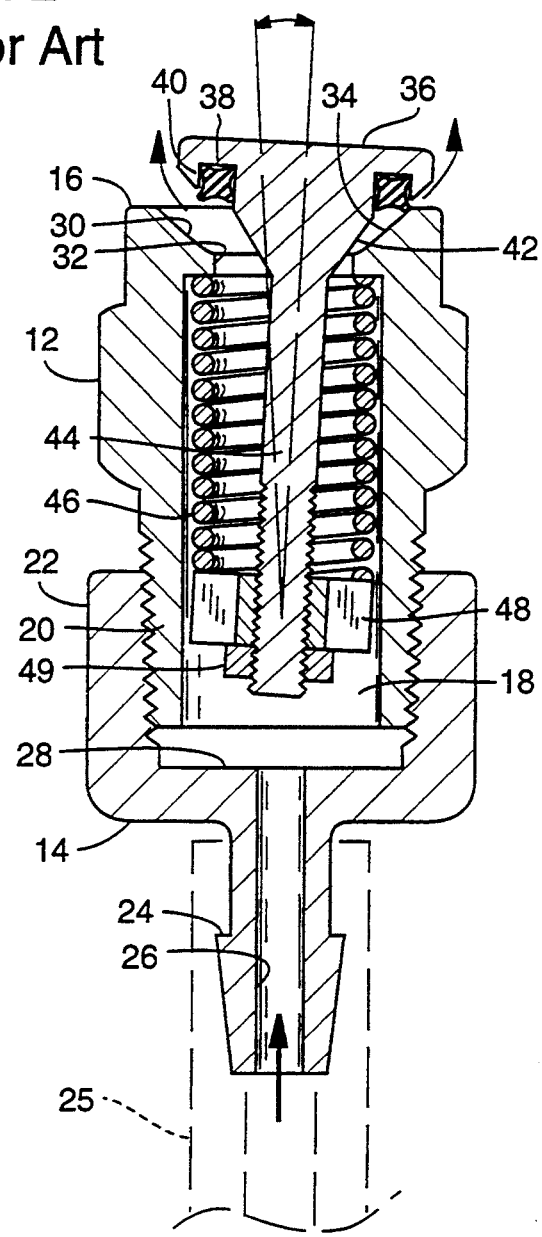

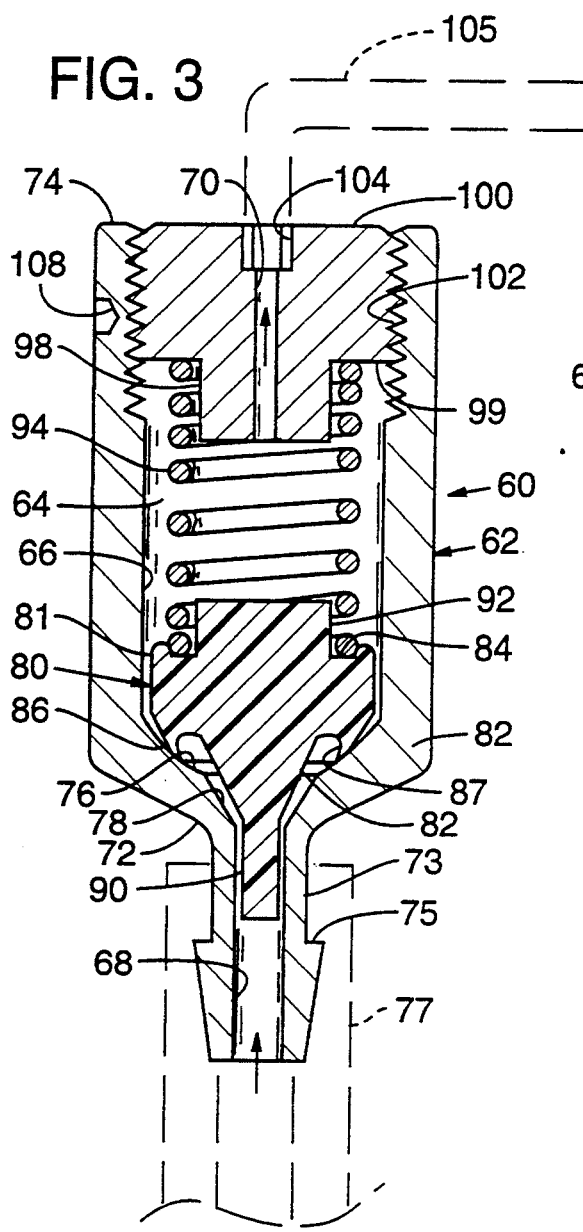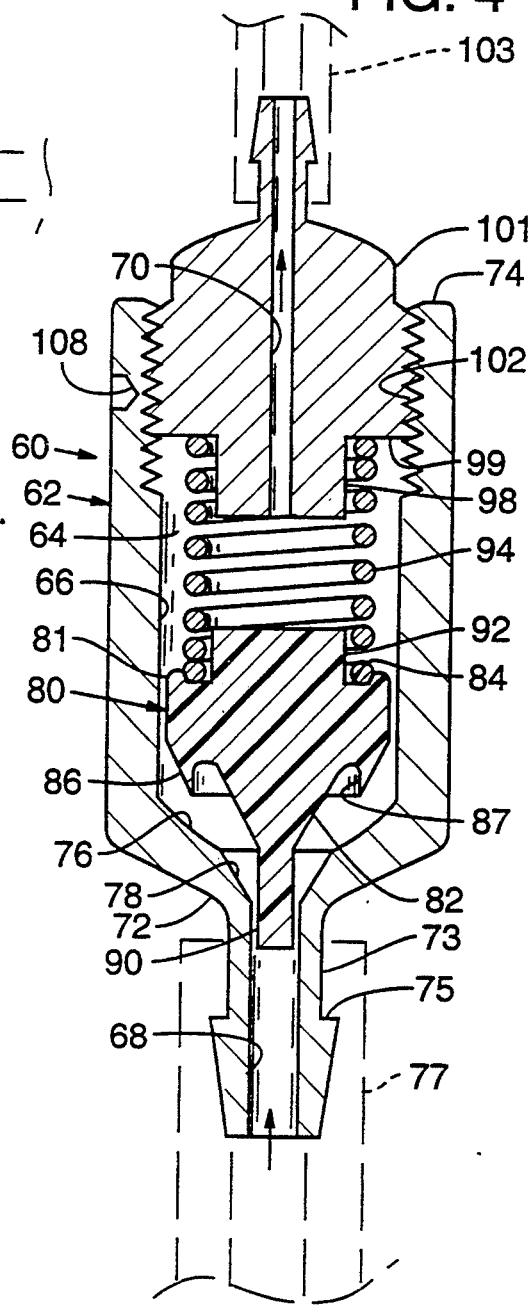

LOW PRESSURE SENSITIVE VALVE

TECHNICAL FIELD

This invention relates to a low pressure responsive valve for close tolerance critical pressure applications as a relief or check valve.

BACKGROUND INFORMATION

Certain applications require relief or check valves that are responsive to critical low pressures within close tolerances. For example, a blood pressure cuff requires a reliable relief valve that predictably and consistently responds to a predetermined relief pressure setting to limit the maximum pressure that can be applied through the cuff.

There are several drawbacks to the prior art relief valve designs currently used: Firstly, the seal on the poppet of a typical prior art relief valve has such a large surface area that it tends to stick to the valve body, resulting in relief pressures that sometimes exceed by up to 25 percent the desired pressure relief setting. Secondly, the seal is usually retained within a groove in a separate metal poppet, which can lead to malfunctions such as leakage of pressurized air past the closed poppet through its seal groove. The seal is squeezed into the groove and conforms thereto at sufficiently high pressure. A tight seal assures close tolerance "cracking-pressure and also close tolerance resealing. Pressure below the threshold to deform the seal to fit the groove cannot provide a close tolerance seal. Thirdly, the poppet of the typical prior art relief valve is subject to excessive vibration when unseated, sometimes causing the poppet to reseat off-center, leading to leakage and to inconsistent, unpredictable and inaccurate relief pressures.

From the foregoing it will be apparent that there is a need for a low pressure sensitive valve that responds accurately and consistently to a predetermined pressure setting, within close tolerances. To this end, objectives of the invention are to provide such a valve with (1) a poppet seal that does not stick or leak, and (2) a poppet that is relatively vibration-free when unseated and consistently reseats in a fully closed position.

SUMMARY OF THE INVENTION

The invention is directed to a reliable fluid pressure relief or check valve that responds within close tolerances to pressures at a desired setting. In a preferred embodiment, the valve includes a valve body defining an internal chamber and coaxial inlet and outlet passages communicating with the chamber at opposite inlet and outlet ends of the body. A valve poppet located within the chamber controls fluid communication between the inlet passage and the chamber. The poppet comprises a one-piece member composed of a monolithic resilient material such as silicone. The poppet defines an annular sealing lip that makes line contact with a valve seat surface when the poppet is closed. The poppet includes a stem that always extends into the inlet passage to center the poppet in its open and closed positions and guide the poppet consistently to its centered fully-seated closed position. The lip and its cooperative valve seat surface are such that inlet pressures below the relief pressure urge the lip into sealing contact with the seat surface. The poppet is biased to its closed position by a spring in the chamber, the pressure setting of which is controlled by a threaded nut or fitting defining the outlet passage and closing the outlet end of the valve body. The nut is used as shown in FIG. 3 when it is desired to vent the valve to atmosphere. The fitting is used as shown in FIG. 4 when it is desired to connect the valve outlet passage to a flexible tube or other device.

The foregoing and other objects, features and advantages of the invention will be become apparent from the following detailed description of what is presently a preferred embodiment.

BRIEF DESCRIPTION OF THE DRAWINGS

FIG. 1 is an axial sectional view of a prior art relief valve in a closed position;

FIG. 2 is an axial sectional view of the prior art relief valve of FIG. 1 in an open position;

FIG. 3 is an axial sectional view of one form of relief valve of the present invention in a closed position; and FIG. 4 is an axial sectional view of a slightly modified form of relief valve of the present invention similar to that of FIG. 3 in an open position.

DETAILED DESCRIPTION OF A PREFERRED EMBODIMENT

Prior Art Valve

FIGS. 1 and 2 show a typical prior art relief valve over which the present invention is an improvement.

With reference to FIGS. 1 and 2, the prior art relief valve 10 includes an elongated valve body 12 having opposite inlet and outlet ends 14, 16 and defining a chamber 18. Inlet end 14 has an externally threaded portion 20 receiving an internally threaded inlet end cap 22. Cap 22 includes a barbed end projection 24 for attaching an inlet tube 25 (shown in dashed lines). The inlet cap 22 defines an inlet passage 26 in communication with an inlet end 28 of chamber 18.

Outlet end 16 of valve body 12 defines an outlet passage 30 in fluid communication with chamber 18. The outlet end 16 further includes an internal collar 32 adjacent a generally conically tapered valve seat 34 for receiving a valve poppet 36 that is movable between a closed position (FIG. 1) and an open position (FIG. 2). Poppet 36 is composed of a non-resilient material such as metal and defines an inwardly facing annular groove 38 at its upper end for receiving a so-called quad ring seal 40. Seal 40 engages valve seat 34 over a wide surface area to seal chamber 18 when poppet 36 is in the closed position. Poppet 36 further includes a conically tapered portion 42 terminating at an elongated partially threaded stem 44 projecting into chamber 18. A coil spring 46 encircles stem 44 and is compressed between internal collar 32 of valve body 12 and a spring adjustment nut 48 threaded to the lower end of stem 44 and dimensioned to fit inside chamber 18. Spring adjustment nut 48 is secured in an adjusted position by a lock nut 49. The compression of coil spring 46, and hence the relief pressure setting of the poppet, can be adjusted by turning wing nut 48 on the threaded stem 44 and locking nut 48 in its adjusted position with lock nut 49. Since spring 46 is compressed between nut 48 and collar 32, poppet seal 40 is urged by spring 46 to engage seat 34 to seal chamber 18.

In operation, when a pressurized fluid, such as air, passes through inlet passage 26 into chamber 18, the air exerts a pressure on poppet 36 in opposition to the compression of spring 46. When the force of the air pressure exerted on the poppet is below the biasing force of spring 46, seal 40 engages valve seat 34 so that the relief valve remains closed as shown in FIG. 1. When the force of the air pressure exceeds the biasing force of spring 46, poppet 36 unseats and moves in an unguided manner from outlet passage 30 to relieve air pressure in line 25 as seen in FIG. 2.

Preferred Embodiments Of Improved valve

Although for convenience and clarity the following description of the present invention refers to the valve as having an "inlet end" and "outlet end" and similarly an "inlet passage" and "outlet passage", assuming the valve is used as a pressure relief valve, it will be understood that when the valve is used as a check valve, the inlet and outlet ends and inlet and outlet passages will be reversed.

With reference to FIGS. 3 and 4, fluid pressure responsive valves 60 of the present invention each include an elongated generally cylindrical valve body 62. Valve body 62 defines an internal chamber 64 having an inside chamber wall 66, and coaxial inlet and outlet fluid passages 68, 70, communicating with chamber 64 at opposite inlet and outlet ends. An inlet end 72 of the valve body includes a neck portion 73 of reduced diameter having an annular barb 75 for allowing a flexible tube 77 (shown in dashed lines) to be attached thereto.

Valve body 62 has a spherically tapered valve seat surface 76 at inlet end 72. The surface is preferably machined to a smooth polished finish to provide a good seal. A No. 63 polished finish has been found suitable for this purpose. Seat surface 76 is concave and faces in the downstream direction toward the outlet end of the valve. Below seat surface 76 is a steeply tapered section 78 leading to inlet passage 68.

A valve poppet 80 is disposed within chamber 64 for controlling fluid communication between inlet passage 68 and chamber 64. Poppet 80 is a one-piece monolithic member including a main body 81, a cylindrical neck portion 92 of reduced diameter, and an annular spring seat groove 84 between the neck and main body. A conically tapered portion 82 of the poppet extends from the main body toward inlet passage 68, terminating in a stem 90 that projects into the inlet passage in both the open and closed positions of the poppet.

Conical poppet portion 82 intersects main body 81 at an annular sealing lip 86 configured to make minimal line contact with concave seat surface 76. For this purpose, the inner surface 87 of lip 86 is preferably concave in the upstream direction toward the inlet end of the valve. A unique feature of the poppet is that it is made in its entirety of a resilient sealant material such as silicone. Other sealant materials such as rubber or non-silicone based plastics can be used. A suitable durometer hardness of the silicone has been found to be 30, with a range of 30-70 thought to be acceptable and about 60 thought to be preferred. The one-piece poppet with integral lip 86 prevents the leakage of air between the poppet and seal as can occur with the prior art valve.

Sealing lip 86 engages seat surface 76 to seal chamber 64 from fluid communication with inlet passage 68. Spring bias forces the sealing lip toward concave seat surface 76. As sealing contact is made, the lip tends to curl toward the center of inlet passage 68 as directed by the concave shapes of the lip inner surface 87 and seat surface 76. The lip and spherical seat surfaces are configured to enable fluid pressure at the inlet side of the closed poppet to force the lip into sealing contact with the seat surface. The small surface area, or line contact, between lip 86 and seat surface 76 reduces the risk of hysteresis or sticking between lip 86 and seat surface 76 and thereby promotes unseating of the poppet at its preset relief pressure or within a close tolerance thereof.

The poppet stem 90 within inlet passage 68 guides the axial opening and closing movement of poppet 80, preventing vibration in the open position and incomplete, off-center seating in the closed position.

The valves 60 of FIGS. 3 and 4 are identical as described thus far and are identical in all respects except for their outlet end closures 100 and 101, respectively. The FIG. 3 valve has the outlet end of its valve body 62 closed by an externally threaded closure nut 100 having an axial outlet passage 70 that vents to atmosphere. The FIG. 4 valve has the outlet end of its identical valve body 62 closed by an externally threaded closure fitting 101 having an axial outlet passage 70 that opens into a connected outlet tube 103 for connection to another device in a fluid circuit. The closure nut of FIG. 3 and the closure fitting of FIG. 4 are interchangeable on the valve bodies of FIGS. 3 and 4. Also, the fitting 101 can be of any of several well-known types, the disclosed type being illustrative only. In essence, the valve can vent to atmosphere (FIG. 3) or transmit pressure through an inline fitting in a fluid circuit.

Outlet side 84 of poppet 80 includes a generally cylindrical compression spring 94 one end of which receives neck 92 of the poppet and is seated in spring seat groove 84. The other end of spring 94 receives a spring receiving neck 98 and engages an inside surface 99 of adjustable nut 100 or fitting 101 closing the outlet end of the valve body. In this way, spring 94 is disposed in compression between the outlet side of poppet 80 and the inside of nut 100 or fitting 101 to bias sealing lip 86 toward seat surface 76 at inlet end 72.

The axial length of the poppet neck 92 and the spring receiving neck 98 limit poppet travel and spring compression.

Nut 100 or fitting 101 is threaded into an inside wall 102 of valve body 62 at its outlet end 74 to close the outlet end. Nut 100 or fitting 101 defines outlet fluid passage 70 from chamber 64 either to atmosphere, or with substitution of fitting 101 for the nut, into the connected outlet tube 103.

The pressure relief setting of valve 60 can be accurately set by adjustment of the threaded engagement of nut 100 or fitting 101 in outlet end 74 of valve body 62. For this purpose, outlet passage 70 is enlarged at the outer end surface of the nut 100 to provide a socket 104 for receiving an Allen or hex wrench 105. Once a desired relief pressure setting is obtained at the factory, nut 100 or fitting 101 can be fixed or locked in place through a center punched cavity 108 on the valve body sidewall 110, effectively destroying the threads at outlet end 74, thereby providing a tamperproof valve. Alternatively, if an adjustable setting is desired, the pressure setting can be accomplished at the factory and then a sealant, weldment, or any other locking device used to secure the end of the valve body. In this way, the user can determine by visual inspection whether the factory setting of the valve has been changed by observing whether the seal is broken.

In operation, when a fluid such as air enters through inlet passage 68 and exerts pressure on sealing lip 86, the resilient sealant material of sealing lip 86 is forced against the spherically tapered valve seat 76 of valve body 62 to cause a positive seal. As the fluid pressure force exerted on inlet side 82 exceeds the biasing force of spring 94, poppet 80 will unseat and move within chamber 64 toward nut 100 or fitting 101 against the biasing force of spring 94. When poppet 80 is unseated, air can pass between poppet 80 and chamber wall 66 out through outlet passage 70 defined by nut 100 or fitting 101, relieving pressure in inlet line 77. When poppet 80 is opened, stem 90 remains in inlet passage 68 to guide or pilot opening and closing movement of the poppet. The guiding of the movement of poppet 80 reduces any undesirable vibration of poppet 80 when it is unseated. When the pressure exerted on inlet side 82 is below the biasing force of spring 94, spring 94 will urge poppet 80 to reseat so that sealing lip 86 is again urged against seating surface 76 to prevent any fluid communication between inlet passage 68 and chamber 64. The guiding movement of stem 90 ensures that poppet 80 always reseats properly within valve body 62 to obtain a good seal between lip 86 and the smooth seat surface 76.

While the present invention has been described in accordance with preferred embodiments, including the "vent-to-atmosphere" embodiment of FIG. 3 and the "inline" embodiment of FIG. 4, it is to be understood that certain substitutions and alterations may be made thereto without departing from the spirit and scope of the appended claims.

I claim:

1. A fluid pressure responsive valve comprising:
   a valve body defining an internal chamber, inlet and outlet fluid passages communicating with the chamber at opposite inlet and outlet ends of the body;
   a valve poppet within the chamber for controlling fluid communication between the inlet passage and the chamber;
   the poppet including a stem projecting into the inlet passage to guide the poppet between open and closed positions;
   the poppet including a lip for making line contact with a valve seat surface at the inlet end when the poppet is in the closed position;
   the seat surface being spherically tapered;
   the poppet comprising a one-piece member composed of a monolithic resilient sealing material, the member including an annular integral said sealing lip for engaging the seat surface at the inlet end and sealing the chamber from fluid communication with the inlet passage.

2. The valve of claim 1 wherein the valve includes biasing means in the chamber for biasing the poppet to a closed position wherein the chamber is sealed against fluid flow from the inlet passage.

3. The valve of claim 2 wherein the biasing means includes means for applying a variable biasing force.

4. The valve of claim 2 wherein the biasing means includes a spring.

5. The valve of claim 4 wherein the spring engages a closure at the outlet end and the poppet at the inlet end to urge the popper toward the closed position.

6. The valve of claim 2 wherein the poppet defines a seat for receiving the bias means.

7. The valve of claim 1 wherein the valve body has the outlet end closed by a threaded closure defining an outlet passage therethrough.

8. The valve of claim 7 wherein the closure adjusts a relief pressure setting of the valve.

9. The valve of claim 8 wherein the closure includes means for locking the closure in an adjusted position to provide a predetermined relief pressure setting.

10. The valve of claim 7 wherein the closure vents the valve chamber to atmosphere.

11. The valve of claim 7 wherein the closure comprises an inline fitting for connection to means defining a fluid passage.

12. The valve of claim 7 wherein the closure is adjustably threaded to the valve body to provide a desired relief pressure setting and the valve body includes means for detecting whether a threaded connection of the closure to the body in an adjusted position has been altered.

13. A fluid pressure responsive valve comprising:
    a valve body defining an internal chamber, inlet and outlet fluid passages communicating with the chamber at opposite inlet and outlet ends of the body;
    a valve poppet within the chamber for controlling fluid communication between the inlet passage and the chamber;
    the poppet including a stem projecting into the inlet passage to guide the poppet between open and closed positions;
    the poppet including a lip for making line contact with a valve seat surface at the inlet end when the poppet is in the closed position;
    the seat surface being spherically tapered;
    wherein fluid pressure at the inlet end urges the lip into sealing engagement with the seat surface when the poppet is in its closed position..

14. A valve body defining an internal chamber, inlet and outlet fluid passages communicating with the chamber at opposite inlet and outlet ends of the body;
    a valve poppet within the chamber for controlling fluid communication between the inlet passage and the chamber;
    the poppet including a stem projecting into the inlet passage to guide the poppet between open and closed positions;
    the poppet including a lip for making line contact with a valve seat surface at the inlet end when the poppet is in the closed position;
    the seat surface being spherically tapered;
    wherein the lip has an inner surface that is concavely curved in a direction toward the inlet end.

15. A fluid pressure responsive valve comprising:
    a valve body defining an internal chamber, inlet and outlet passages communicating with the chamber at opposite inlet and outlet ends of the body;
    a valve poppet within the chamber for controlling fluid communication between the inlet passage and the chamber;
    the poppet including a stem projecting into the inlet passage to guide the poppet between open and closed positions;
    the poppet including a lip for making line contact with a valve seat surface at the inlet end when the poppet is in the closed position;
    the lip having an inner surface that is concavely curved in a direction toward the inlet end;
    the seat surface being concavely curved in a direction toward the outlet end.

16. The valve of claim 15 wherein the poppet is a one-piece poppet composed of a monolithic elastomeric sealing material, the material having a hardness in a range of about 30–70 durometer.

17. The valve of claim 16 wherein the material is a silicone.

18. The valve of claim 15 wherein the seat surface tapers inwardly toward the inlet end.

19. A low fluid pressure responsive valve for close tolerance critical pressure applications as a relief or check valve, comprising:

a valve body defining an internal chamber, inlet and outlet fluid passages communicating with the chamber at opposite inlet and outlet ends of the body, and a valve seat surface adjacent the inlet end;

a valve poppet within the chamber having open and closed positions for controlling fluid communication between the inlet passage and the outlet passage;

the poppet comprising a one-piece member composed of a monolithic elastomeric sealing material having an integral annular sealing lip for making line contact with the valve seat surface when the poppet is in a closed position, the poppet further including a stem projecting into the inlet passage such that the wall of the inlet passage guides the poppet between open and closed positions;

the seat surface being tapered inwardly in a direction toward the inlet passage;

the lip and seat surface being cooperatively shaped such that a closing force exerted against the poppet from within the chamber causes the lip to be deflected inwardly toward the inlet passage upon contact with the seat surface.

20. The valve of claim 19 wherein the lip has an inner surface that is concavely curved in a direction toward the inlet end and the seat surface is concavely curved in a direction toward the outlet end.

21. The valve of claim 19 wherein fluid pressure at the inlet end urges the lip into sealing engagement with the seat surface when the poppet is in its closed position.

22. The valve of claim 19 including a coil spring within the chamber engaging an annular spring seat on the poppet to bias the poppet to a closed position, the spring seat being in substantial axial alignment with the annular lip.

23. The valve of claim 22 wherein the valve body has a threaded closure defining the outlet fluid passage therethrough, the spring extending between the poppet and the closure and being in direct engagement with both the poppet and the closure.

24. The valve of claim 23 wherein threaded adjustment of the closure adjusts the spring force applied to the poppet to provide the poppet with an adjustable relief pressure setting.

25. The valve of claim 24 wherein the valve body includes means for detecting whether a threaded connection of the closure to the body in an adjusted position has been altered.

* * * * *